Jan. 15, 1957  R. E. PARSHALL  2,777,730
ARMREST FOR VEHICLE WINDOW SILLS
Filed Nov. 3, 1955
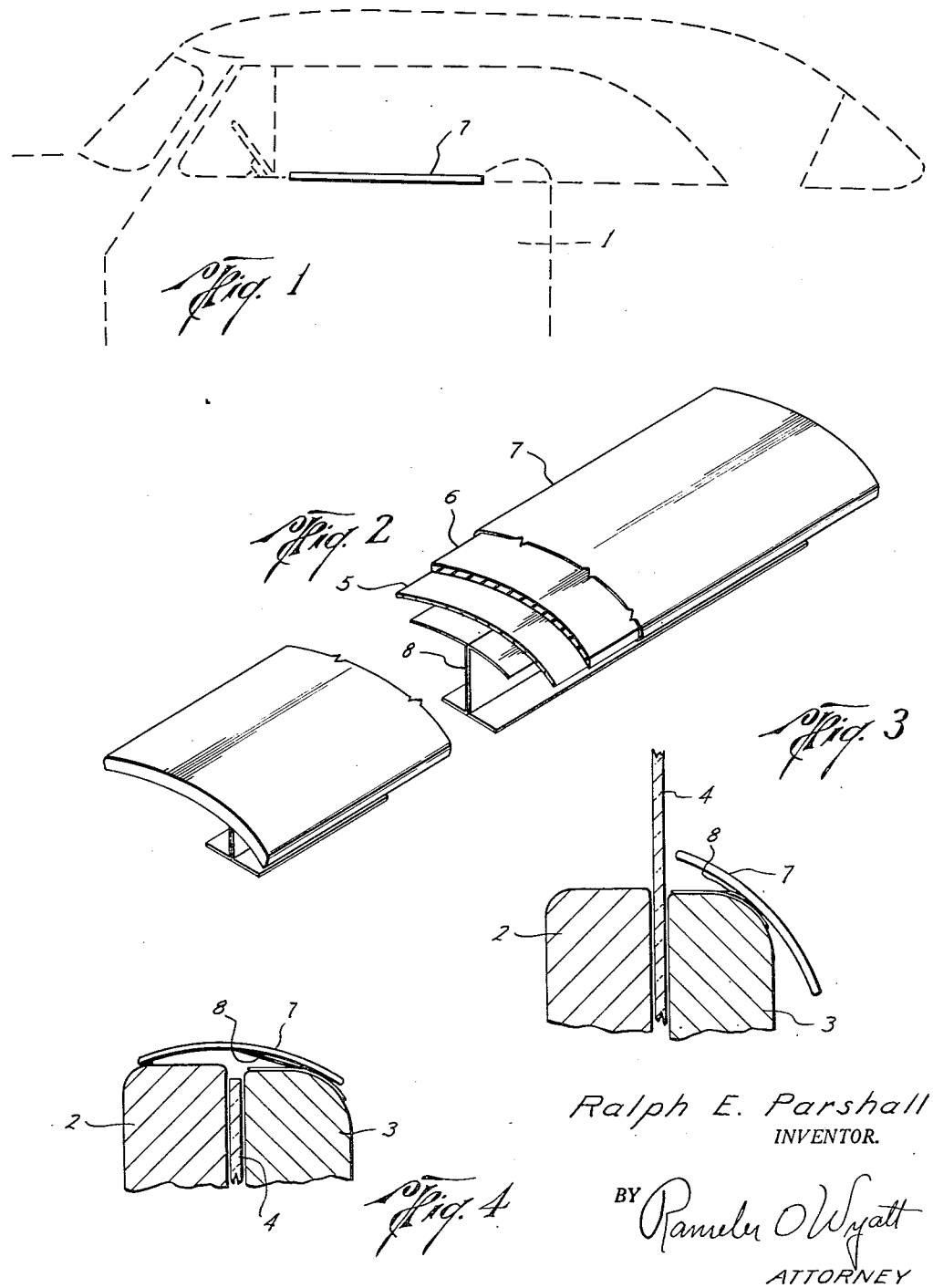
Ralph E. Parshall
INVENTOR.
BY Pameler O Wyatt
ATTORNEY

United States Patent Office 2,777,730
Patented Jan. 15, 1957

2,777,730

ARMREST FOR VEHICLE WINDOW SILLS

Ralph E. Parshall, Houston, Tex.

Application November 3, 1955, Serial No. 544,655

3 Claims. (Cl. 296—49.2)

This invention relates to new and useful improvements in an arm rest.

It is an object of this invention to provide an arm rest for use on automobiles, particularly for use on the driver's side of the vehicle, to provide a comfortable rest for the left arm of the driver, while driving and while signaling with the left arm.

It is another object of the invention to provide an arm rest for use on automobiles which may be quickly and easily shifted from a position over the lowered window to a position adjacent the window when it is desired to raise the said window.

It is still another object of the invention to provide an arm rest for automobiles that may be quickly and easily detachably mounted on the door of the vehicle without injury to the paint or finish of the vehicle and without the use of bolts or screws.

With the above and other objects in view, the invention has relation to certain novel features of construction, operation and arrangement of parts more particularly defined by the following specifications and illustrated in the accompanying drawings, wherein:

Figure 1 is a longitudinal side view of the rest, indicating in dotted lines a vehicle on which it may be mounted.

Figure 2 is a top perspective view, partially in cross section.

Figure 3 is a side elevational view of the device, mounted on a vehicle, and shown in one position, and Figure 4 is a side elevational view of the device mounted on a vehicle, in another position.

Referring now more particularly to the drawings, the numeral 1 designates a vehicle door having the conventional side panels 2, 3, the panel 3 being the inside panel. A glass window 4 is mounted between the panels 2, 3 in the usual manner which is vertically movable. The arm rest consists of the metal body member 5 on which may be mounted suitable upholstery, such as sponge rubber 6 and which may be covered with suitable covering material 7, such as is commonly used for seat covers. The body member 5 is contoured, being concave-convex, to form a slightly curved surface.

Suitable adhesive tape, such as is used for industrial purposes, having a pressure sensitive adhesive on one side thereof, is secured to the concave side of the body member, which will bind the covering material in place. This tape is wide enough to provide a hinge, as 8, the hinge being formed by placing two pieces of adhesive tape together, the adhesive sides abutting, and spreading the upper one third of the respective strips of tape outwardly, in opposite directions, and against the body member 5, or the covering material thereof, anchoring the tape to the body member and forming a hinge of the depending portion of the tape, and positioning the tape so that the depending portion suspends slightly to the right, or to the inside of, the longitudinal center line of the body member 5, then spreading the lower portion of the tape, approximately one third thereof, outwardly, the respective strips of tape being extended in opposite directions, and pressing the adhesive side thereof onto the top surface of the side panel 3, with the longitudinal outside edge of the body member 5 positioned along the inside edge of the panel 3 adjacent the window 4. The tape 8 is of sufficient width that the longitudinal edge of the tape strip extended towards the outside of the vehicle is also parallel with the inside edge of the panel 3 abutting the window 4, and the body member 5 resting on the inside panel 3. When the window 4 is raised, as shown in Figure 3, the rest may be swung on the hinge 8 inwardly, to the position shown in Figure 3, where it will still function as an arm rest. When the window 8 is lowered, the member 5 may be swung outwardly, over the window 8, the longitudinal side margins thereof resting on the side panels 2, 3. In this position the device provides a comfortable rest for the left arm of the driver, and acts as a guard against the burn of hot metal in the Summer when the window is normally in lowered position. When the window is in raised position, the device still provides an arm rest for the left arm of the driver.

In marketing the device, the tape may be mounted on the body member and the portion designed to be secured to the panel of the vehicle may be covered with a protective strip of paper, as is customary with pressure sensitive adhesive tapes for industrial use, and which may be removed by the user prior to installation of the rest on the vehicle.

It is obvious the device may be used for the vehicle door opposite the driver's side, if desired.

While the foregoing is considered a preferred form of the invention, it is by way of illustration only, the broad principle of the invention being defined by the appended claims.

What I claim is:

1. In the combination of a vehicle door and arm rest, a rigid body member having cushioning means and covering means mounted thereon, a vehicle door, a hinge securing said body member to the said door comprising a pair of longitudinal strips of adhesive tape, said tape having a portion thereof secured to the body member longitudinally and to the right of the longitudinal axis of the body member, said tape extending downwardly from said body member and having the adhesive sides thereof abutting, forming a depending spacing means, and the lower portion of said tape extending downwardly and being spread outwardly in opposite directions and adhering to the vehicle door on the inside upper edge thereof, the outside margin of said tape being parallel with the outside margin of the inside panel of said door and abutting against the outer edge thereof.

2. In the combination of a vehicle door and an arm rest, the said door having inside and outside panels between which said windows are movable, said rest comprising a body member, adhesive tape secured to the underside of said body member immediately adjacent its longitudinal axis, said tape having a portion thereof secured to the inside door panel and a portion thereof depending between said body member and said panel a sufficient distance to permit the outside margin of said body member to abut the outside margin of said inside panel adjacent said window when in one position, and to permit said body member to extend over both of said panels when in another position.

3. The combination of a motor vehicle door and an arm rest, said door having inside and outside panels and a vertically movable window between said panels, said rest comprising a body member, said body member being rectangular in shape and having strips of adhesive tape depending from a line parallel and to the inside of the longitudinal axis of said body member, the depending portion of said tape having adhesive faces joined and the lower portion of said tape separated and outwardly extended and adhered to the top margin of the inside panel of said door with the outside strip having its outer margin positioned along the outer margin of said panel adjacent said window, and the depending portion of said tape forming a hinge for said body member.

References Cited in the file of this patent

UNITED STATES PATENTS

| | | |
|---|---|---|
| 2,080,734 | Mull | May 18, 1937 |
| 2,547,487 | Penney | Apr. 3, 1951 |
| 2,577,561 | Atwater | Dec. 4, 1951 |
| 2,670,235 | Susil | Feb. 23, 1954 |